United States Patent
Shavit et al.

(10) Patent No.: US 10,552,349 B1
(45) Date of Patent: Feb. 4, 2020

(54) SYSTEM AND METHOD FOR DYNAMIC PIPELINING OF DIRECT MEMORY ACCESS (DMA) TRANSACTIONS

(71) Applicant: LIGHTBITS LABS LTD., Kfar Saba (IL)

(72) Inventors: Amir Shavit, Mishmar David (IL); Roy Geron, Beit Izchaq (IL)

(73) Assignee: LIGHTBITS LABS LTD., Kfar Saba (IL)

( * ) Notice: Subject to any disclaimer, the term of this patent is extended or adjusted under 35 U.S.C. 154(b) by 0 days.

(21) Appl. No.: 16/008,084

(22) Filed: Jun. 14, 2018

Related U.S. Application Data

(63) Continuation of application No. 15/993,649, filed on May 31, 2018, now abandoned.

(51) Int. Cl.
*G06F 13/36* (2006.01)
*G06F 13/16* (2006.01)
*G06F 13/28* (2006.01)

(52) U.S. Cl.
CPC ...... *G06F 13/1668* (2013.01); *G06F 13/1673* (2013.01); *G06F 13/28* (2013.01); *G06F 2213/0026* (2013.01)

(58) Field of Classification Search
None
See application file for complete search history.

(56) References Cited

U.S. PATENT DOCUMENTS

| 6,061,073 A | * | 5/2000 | Larson | G06T 15/005 345/501 |
| 2019/0037043 A1 | * | 1/2019 | Xu | G06F 9/4416 |

FOREIGN PATENT DOCUMENTS

WO   WO-2017157145 A1 *  9/2017  ......... G06F 9/4416

* cited by examiner

*Primary Examiner* — Henry Tsai
*Assistant Examiner* — Dean Phan
(74) *Attorney, Agent, or Firm* — Pearl Cohen Zedek Latzer Baratz LLP

(57) ABSTRACT

A method and a system for pipelining read transactions of a host computer from a storage module, including: transferring from a host computer to an accelerator a read list, including at least one pointer to a data block stored on the storage module, and a respective data block size; sending an acknowledgement to the host; fetching at least one data block by the accelerator from the storage module, and writing it to a staging buffer in a sequential order; sending at least one read request from the host computer to the accelerator, relating to at least one requested data block. If the data block is available on the staging buffer, then sending the corresponding data to the host from the staging buffer. Otherwise the read response is delayed until the requested data is fetched from the storage module.

16 Claims, 5 Drawing Sheets

SYSTEM AND METHOD FOR DYNAMIC PIPELINING OF DIRECT MEMORY ACCESS (DMA) TRANSACTIONS

CROSS-REFERENCE TO RELATED APPLICATIONS

This application is a continuation of U.S. patent application Ser. No. 15/993,649, filed May 31, 2018, which is hereby incorporated by reference.

FIELD OF THE INVENTION

The present invention relates generally to non-volatile computer storage systems. More specifically, the present invention relates to pipelining of Direct memory Access (DMA) transactions

BACKGROUND OF THE INVENTION

Data access operations commonly require copying data from non-sequential source memory areas to a single, sequential destination memory area, to be used by a requesting process. Such operations may involve multiple, separate Direct Memory Access (DMA) transactions, to access different, non-sequential addresses of the source memory. The latency of non-sequential data access operations increases with the data storage entropy (e.g. the extent to which the data is non-sequential), as all copy operations must be completed before the data itself can be used by the requesting process.

Accessing non-sequential data on the source memory will normally include the steps of: (1) Copying each data unit separately, using a separate DMA transaction; (2) Polling for all DMA transactions to be completed; and (3) Enabling another process to access the source memory only after all the data of the previous process has been read. This work flow may be unacceptable in latency-sensitive applications.

In typical cases, the data itself may be used in a sequential manner (e.g. the data which is copied by the first DMA transaction may be used first by the requesting process). However, this quality is difficult to exploit in order to pipeline the DMA transactions with the requesting process itself. Typically, pipelining the requesting process with the DMA transactions requires dividing the requesting process into multiple sub-processes, each waiting for its own DMA transaction to be completed. This architecture requires a multiple polling scheme: both on the DMA transaction, and on the sub-process which makes use of the copied data, each waiting for the other to be completed.

Accordingly, a system and a method for dynamic pipelining of DMA transactions is desirable.

SUMMARY

Embodiments of the invention may include a system and a method of pipelining read-access transactions between a host computer and a computer storage module.

Embodiments of the system may include: a staging buffer and an accelerator. The accelerator may include a non-transitory memory device, whereupon modules of computer code are stored, and a processor associated with the non-transitory memory device. The processor may be configured to execute the modules of computer code, to implement the method of pipelining read-access transactions between a host computer and a computer storage module, as elaborated herein.

An embodiment may include: (a) transferring from the host computer to an accelerator a first pointer to a read list. The read list may include at least one second pointer to at least one data block stored on the storage module, and at least one block size parameter referring to the size of the at least one data block pointed to by the second pointer; (b) sending an acknowledgement message from the accelerator to the host; (c) fetching at least one data block by the accelerator from the storage module, according to the at least one second pointer and at least one block size parameter. The data block may be fetched by one or more direct memory access (DMA) transactions; (d) writing the at least one fetched data block to a staging buffer. The at least one fetched data block may be written or copied to the staging buffer in a sequential order; (e) sending at least one read request from the host computer to the accelerator, relating to at least one data block referred to by the at least one second pointer; and (f) sending a read response from the accelerator to the host, including the corresponding data from the staging buffer.

In some embodiments, if data corresponding to the read request is available on the staging buffer, then the accelerator will send a read response to the host, including the corresponding data from the staging buffer. Otherwise, the accelerator will delay the read response until the corresponding data is fetched from the storage module.

The size of the staging buffer may be customized according to predefined parameters, including at least one of: expected data block size, expected data fetch rate, expected data read rate, host computer memory resources, host computer processing resources and host computer load.

At least one read response may be sent from the accelerator to the host computer prior to fetching all the data from the storage module referred to by the at least one second pointer of the read list.

In some embodiments, the staging buffer may be cyclic, and the accelerator may be configured to increment a write pointer of the cyclic buffer whenever a data block is fetched from storage, according to the size of a fetched data block. The accelerator may be configured to increment a read pointer of the cyclic buffer whenever a read response is sent to the host, according to the size of a read data block.

The accelerator may delay a fetch of a data block from the storage module if the difference between the read pointer and the write pointer of the cyclic buffer is such that the data block may not be fetched without overriding data that has not yet been read from the cyclic buffer by the host computer.

Embodiments of the invention may include an accelerator device for streamlining the retrieval of data from computer storage media, accelerator consisting a processor and a staging buffer. The processor may be configured to: (a) receive at least one read list from a host computer, referring to at least one data block stored on the storage media; (b) copy at least one data block from the storage module to the staging buffer according to the read list; (c) receive at least one read request from the host computer, relating to at least one data block referred to by the read list; and (d) send a read response to the host computer, comprising the at least one data block from the staging buffer.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
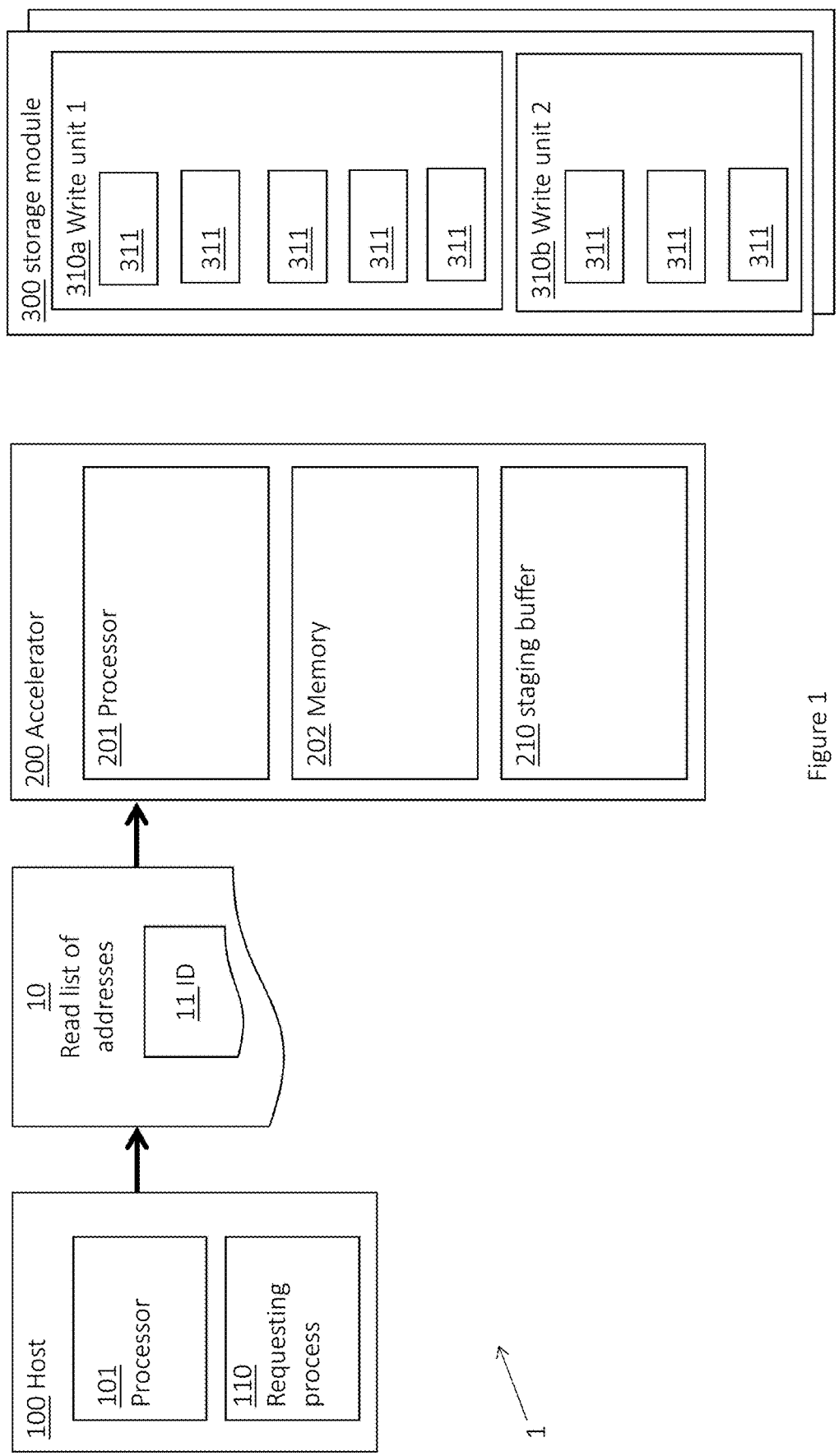
FIG. 1 is a block diagram, depicting a system for dynamic pipelining of DMA transactions, during initiation of a data access operation by a requesting process, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention include a method and a system for dynamic pipelining of DMA transactions between a host computer and a storage module, where the host computer may be running or executing at least one process that may require access to data that is stored on the storage module; and the storage module may be implemented as any type of storage media, including for example: a non-volatile flash memory (NVM) device, a solid-state drive (SSD), a hard disk drive (HDD), and the like.

The term dynamic memory access (DMA) refers herein to accessing of data stored within the storage module by the requesting process of the host computer, through a dedicated accelerator module.

The term write-unit refers herein to a storage element, including a contiguous storage space of the storage module, and includes an integer number of storage blocks. According to some embodiments, the requested data may be stored sequentially, or non-sequentially, in one or more write-units.

Reference is now made to FIG. 1, which is a block diagram, depicting a system for dynamic pipelining of DMA transactions, during initiation of a data access operation by a requesting process, according to some embodiments.

System 1 may include a host computer 100, which may be implemented as a computerized device (e.g. a server, a laptop computer, a smartphone, and the like) and may include at least one processor 101. Host computer 100 may be communicatively connected (e.g. via a computer network) with at least one storage module 300. For example, host computer 100 may be a server, configured to query data from a database, which resides on storage module 300, located in a data center.

System 1 may include an accelerator 200, associated with at least one storage module 300, and communicatively connected with host computer 100. For example, accelerator 200 may be connected to host computer 100 via a computer network and attached to at least one storage module 300 through a Peripheral Component Interconnect Express (PCIE) bus.

For example, accelerator 200 may be connected to a plurality of storage modules 300, e.g. via a plurality of busses (e.g. a plurality of PCIE busses). In another example, accelerator 200 may be connected to a plurality of storage modules 300 via a common bus (e.g. a common PCIE bus). In yet another example, accelerator 200 may be connected to a plurality of storage modules 300 via a switch (e.g. a PCIE switch), as known to persons skilled in the art of electric engineering.

According to some embodiments, accelerator 200 may include a non-transitory memory device 202, configured to store modules of computer code, and a processor 201, associated with non-transitory memory 202. Processor 201 may be configured to execute the modules of computer code, whereupon execution of the computer code by processor 201 may perform handling of data fetching or retrieving from storage module 300, as elaborated further below. In these embodiments, accelerator 200 may not consume computational resources (e.g. processor cycles, memory allocation) of host computer 100.

In alternate embodiments, the operation of accelerator 200 may be implemented as a software module and may be executed (e.g. as a software process) by one or more processors 101 of host computer 100.

FIG. 1 depicts an initiation of a data access operation by a requesting process 110, that may be executed on host computer 100 by processor 101, according to some embodiments. The requesting process 110 may require access to data that is stored on storage module 300 and distributed over one or more write-units (e.g. 310a, 310b), and among one or more data blocks (e.g. 311). Accelerator 200 module may be configured to handle the process of data fetching and pipelining from the storage module 300 to host computer 100, as explained herein.

As shown in FIG. 1, data fetching may be initiated by requesting process 110 on host computer 100, by transferring a read list 10 or other set of required addresses to accelerator 200. Read list 10 may be transferred in one of a plurality of formats, including for example: (a) a list of physical addresses, e.g. pointers to physical addresses of data blocks on storage module 300; (b) a reference (e.g. a pointer) to a stored list of physical addresses e.g. pointers to physical addresses of data blocks on storage module 300; (c) a list of logical addresses, associated with physical addresses of storage module 300; and (d) a reference (e.g. a pointer) to a stored list of logical addresses, associated with physical addresses of storage module 300.

Read list or set 10 may include at least one start address and at least one respective end addresses of a data block of storage module 300. Alternately, read list 10 may include at least one start address, and at least one respective block-size parameter of a data block of storage module 300.

Accelerator 200 may receive a plurality of Read lists or sets 10, and may queue them (e.g. in memory module 202). Read list or set 10 may further include an identification (ID) number 11, configured to uniquely identify each read list or set 10 from other read lists or sets queued within accelerator 200.

Figure 2:
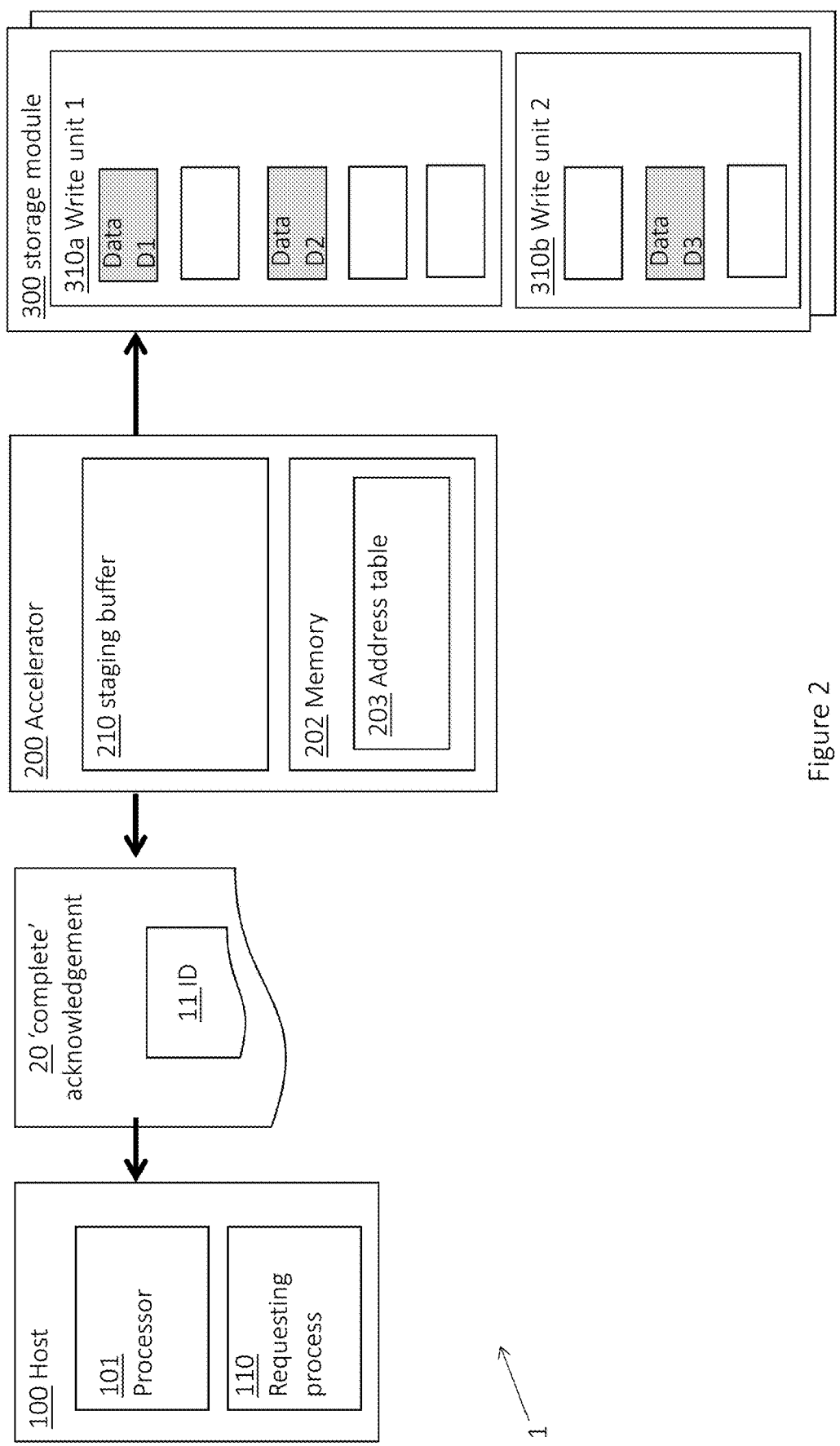
FIG. 2 is a block diagram, depicting a system for dynamic pipelining of DMA transactions, during a first phase of data access by a requesting process, according to some embodiments.

Reference is now made to FIG. 2, which is a block diagram of a system for dynamic pipelining of DMA transactions, during a first phase of data retrieval by a requesting process, according to some embodiments.

Accelerator 200 may receive a read list (e.g. element 10 of FIG. 1) of required addresses and respond with a 'complete' acknowledgement message 20 to host computer 100. Complete acknowledgement message 20 may include for example, an ID 11 of the requested read list 10, to notify host 100 that accelerator 200 has begun to handle requested read list 10, by fetching the respective data from storage 300.

Accelerator 200 may then fetch or retrieve the data from physical addresses of storage module 300 that correspond with the read list 10 of required addresses, according to the format of the list 10. For example, accelerator 200 may: (a) receive a pointer to a list of logical addresses (e.g. a list of logical block addresses), referred to by the requesting process 110; (b) read the list of logical addresses from its storage location; (c) hold or store a logical-to-physical address table 203, associating logical addresses with physical addresses of storage module 300 (e.g. addresses of physical blocks, such as elements 311 of FIG. 1); (d) extract physical addresses of storage module 300 that correspond with the list of logical addresses, through the logical-to-physical address table 203; and (e) fetch data from physical data blocks (e.g. elements 311 of FIG. 1) of storage module 300, corresponding with the extracted physical addresses.

Figure 3:
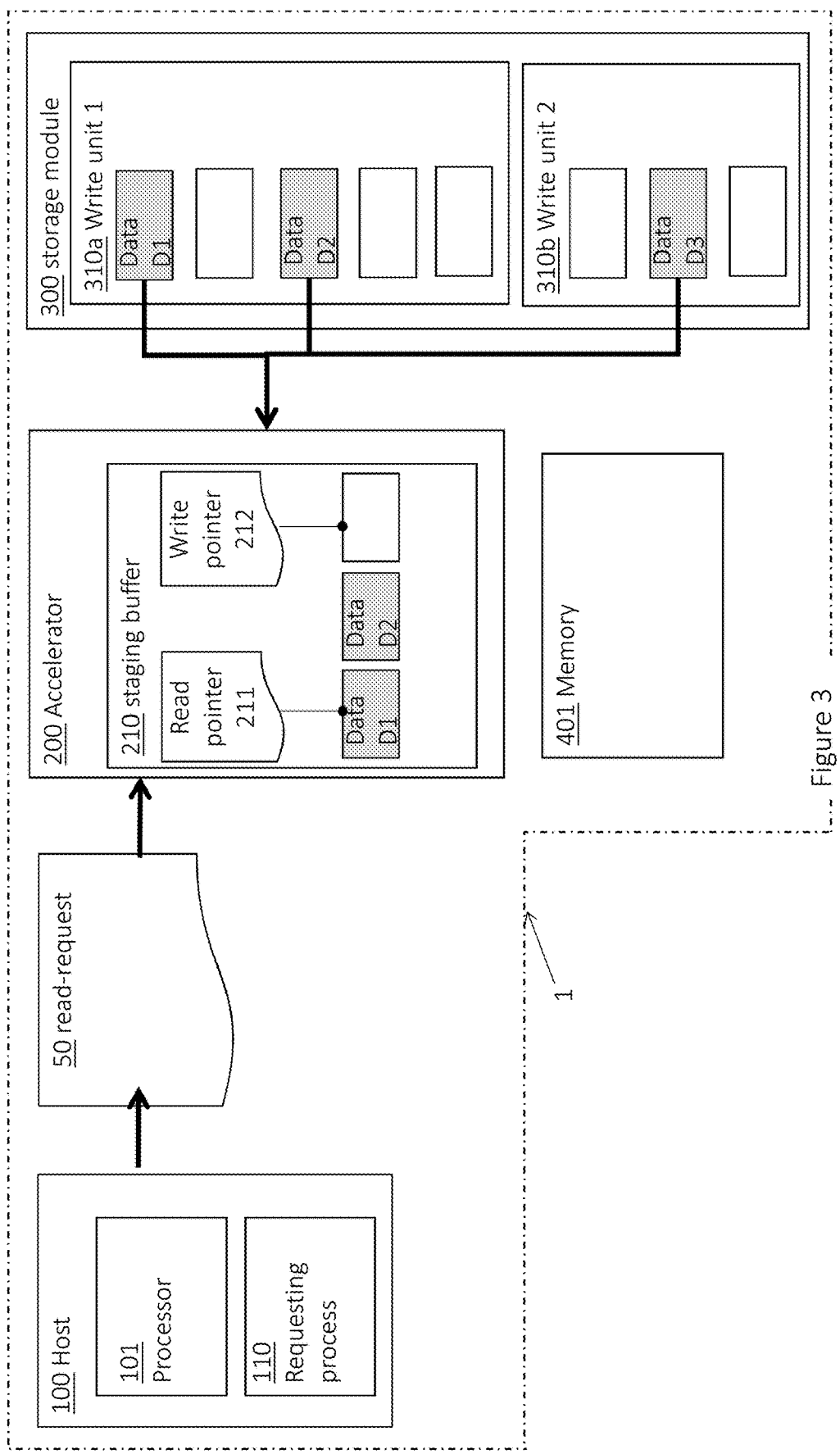
FIG. 3 is a block diagram, depicting a system for dynamic pipelining of DMA transactions, during a second phase of data access by a requesting process, according to some embodiments.

Reference is now made to FIG. 3, which is a block diagram depicting a system for dynamic pipelining of DMA transactions, during a second phase of data access by a requesting process, according to some embodiments. Accelerator 200 may copy or transfer at least one data block from the storage module to the staging buffer according to the read list. For example, accelerator 200 may fetch data from at least one data block of storage module 300 and may write the data in a sequential order (e.g. data D1, data D2, data D3 . . . ) into staging buffer 210.

According to some embodiments, staging buffer 210 may be included within a memory space that is associated with, or integrated within accelerator 200 (e.g. element 202 of FIG. 1). Alternately, staging buffer 210 may be included within a memory space that is not integrated within accelerator 200, such as an external memory module 401.

Staging buffer 210 may be implemented as a cyclic buffer, in which the read location is referred to by a read pointer 211, and the write location is referred to by a write pointer 212. Accelerator 200 may be configured to increment write pointer 212 whenever a data block is fetched from storage module 300 according to the size of the fetched data block and increment read pointer 211 whenever a read response is sent to host computer 100, according to the size of the read data block. Read pointer 211 and write pointer 212 may be configured to increment from a start address of the staging buffer 210 to an end address of the staging buffer 210 and roll over to the start address in a cyclic order, to override old data when the staging buffer 210 is full.

According to some embodiments, accelerator 200 may be configured to customize the size of staging buffer 210. For example: in embodiments where staging buffer is included within a memory space that is allocated within memory module 202 of accelerator 200, the size of staging buffer 210 may be customized by adjusting the difference between the start address and the end address.

Customization of the staging buffer's size may be performed according to a set of predefined parameters, including for example: expected data block size, expected data fetch rate from storage 300, expected data read rate by the host computer 100, memory resources of host computer 100, processing resources of host computer 100, and workload of host computer 100.

For example, processor 201 may receive (e.g. from a user) a value of at least one parameter of the set of predefined parameters (e.g. expected data block size, expected data fetch rate, etc.). Processor 201 may allocate a small memory space for staging buffer 210 when (a) the expected data block size is small, or (b) the expected data fetch rate from storage 300 is low, or (c) the expected data read rate by the host computer 100 is high, or (d) memory resources of host computer 100 are large, or (e) host computer 100 has sufficient processing resources, or (f) the workload of host computer 100 is mild. In a complementary manner, processor 201 may allocate a large memory space for staging buffer 210 for complementary conditions (e.g.: the expected data block size is large, etc.).

In some embodiments, processor 101 of host 100 may receive the allocated memory space for staging buffer 210 (e.g. via a user or via complete acknowledgement message 20). Processor 101 may utilize this information to optimize data fetching from storage 300, for example: processor 101 may avoid including in read list 10 an amount of data that exceeds the size of staging buffer 210. In a complementary example, processor 101 may avoid dividing the required amount of data to a plurality of excessively small read lists or sets 10.

After receiving a 'complete' acknowledgement (e.g. element 20 of FIG. 2), in response to read list or set 10, host 100 may send a read request 50 message to accelerator 200, including a request to read at least one data block (e.g. D1) that is a subset of the data included in read list or set 10. Host 100 may send read request 50 (e.g. for data D1) at a timing that is synchronized or non-synchronized to the fetching of the data (e.g. D1) from storage 300.

Figure 4:
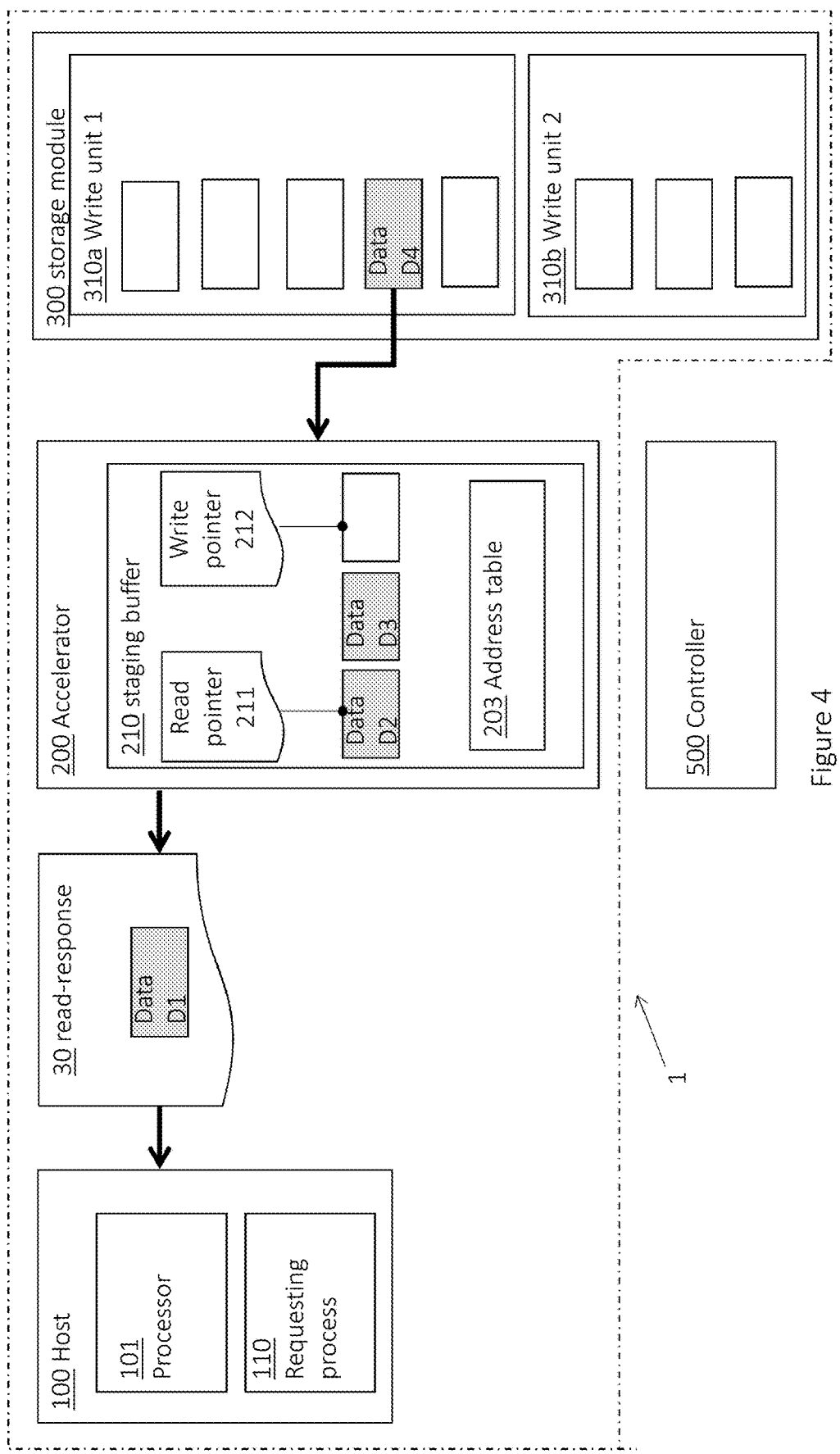
FIG. 4 is a block diagram, depicting a system for dynamic pipelining of DMA transactions, during continuous data access by a requesting process, according to some embodiments.

Reference is now made to FIG. 4, which is a block diagram depicting a system for dynamic pipelining of DMA transactions, during continuous data access by a requesting process, according to some embodiments. Accelerator 200 may receive at least one read request 50 from host computer 100, relating to at least one data block that is referred to by read list (e.g. element 10 of FIG. 1), such as Data D1. If the data corresponding to the read request is available on staging buffer 210, then accelerator 200 may send a read response to host computer 100, including the respective data from the staging buffer 210. If the data corresponding to the read request (e.g. Data D1) is not available on staging buffer 210, then accelerator 200 may delay the read response, e.g. not send the read response, until the time that the data is fetched from storage module 300 and is made available on staging buffer 210.

According to some embodiments, storage module 300 may be associated with a controller (e.g. 500), that may be configured to access data stored on blocks of storage module 300. In these embodiments, host computer 100 may be configured to fetch at least one data block from storage module 300 by a direct memory access (DMA) transaction via accelerator 200, without requiring computational resources (e.g. computational cycles, memory allocation, etc.) from controller 500.

As shown in FIG. 4, according to some embodiments, accelerator 200 may be configured to send at least one read response 30 to host computer 100, including data from at least one data block of storage module 300. This may be done after some of the data is fetched and prior to fetching all of the data referred to by the read list (e.g. element 10 of FIG. 1). This configuration enables requesting process 110 to operate as a pipeline: requesting-process 110 may read and process portions of the requested data, while accelerator 200 fetches additional portions of data from storage module 300.

As explained herein, staging buffer 210 may be implemented as a cyclic buffer, in which the read location may be referred to by a read pointer 211, and the write location may be referred to by a write pointer 212. In some embodiments, accelerator 200 may be configured to delay a fetch of a data block from storage module 300 if the difference between read pointer 211 and write pointer 212 is such that the additional data block may not be fetched without overriding data that has not yet been read from the staging buffer 210 by host computer 100.

As explained above, address table 203 may include a logical-to-physical address table, associating logical addresses (e.g. logical block addresses) with physical addresses of storage module 300 (e.g. addresses of physical blocks, such as elements 311 of FIG. 1). In some embodiments, address table 203 may further include a validity metadata flag, associating a validity value (e.g. 'valid' or 'invalid') to each physical block that is fetched by accelerator 200 from storage 300:

When data of a physical block is fetched from storage 300, processor 201 may set the value of the respective validity flag to 'valid', marking this data block as new and unread.

When the data block is read by host 100 via read-response 30, processor 201 may reset the validity value to 'invalid'.

The flagging of logical data blocks as 'valid' or 'invalid' may provide the following benefits:

In some embodiments, host 100 may execute two or more processes that may require access to the same physical data blocks. Accelerator may respond to a first read-request, initiated by a first process with a first read-response 30, containing the requested data. If a second process sends a second read-request that requires access to the same data block, accelerator 200 may send a read-response that only includes an indication that the data block has already been read, and is therefore already available on the memory of host 100.

In some embodiments, host 100 may require access to a non-sequential memory space that exceeds the span of staging buffer 210. For example, staging buffer may be allocated a memory space of 0x2000 blocks, and the read list may include a first request to fetch data from physical address 0x1000 to 0x1FFF, and a second request to fetch data from physical address 0x3000 to 0x3FFF. As the span of requested data (e.g. 0x1000 to 0x3FFF blocks) exceeds the memory space allocated for staging buffer 210 (e.g. 0x2000 blocks), and since accelerator 200 is configured to fetch data from storage 300 in a sequential order, the fetching of data may fail. Processor 201 may therefore mark, or flag data blocks 0x1000 to 0xFFF and 0x3000 to 0x3FFF as valid, and may mark data blocks 0x2000 to 0x2FFF as invalid, to only fetch the 'valid' blocks, and avoid a failure.

Figure 5:
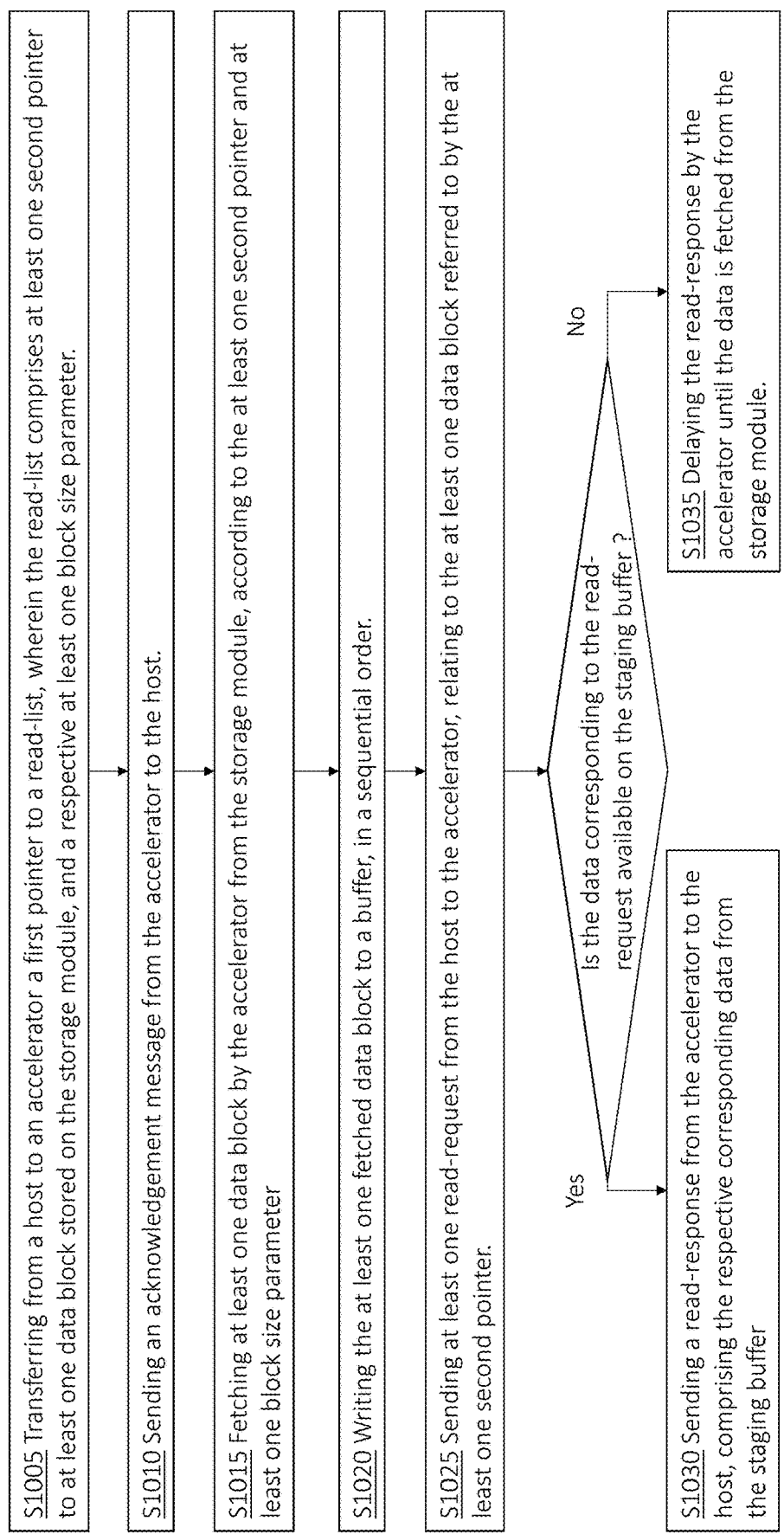
FIG. 5 is a flow diagram, depicting the method for dynamically pipelining DMA transactions between a host computer and a storage module, according to some embodiments.

Reference is now made to FIG. 5, which is a flow diagram, depicting an embodiment of a method for dynamically pipelining DMA transactions between a host computer and a storage module.

Some embodiments may include:

Transferring from a host computer to an accelerator a first pointer to a read list, wherein the read list includes: at least one second pointer to at least one data block stored on the storage module, and at least one block size parameter referring to the size of the at least one data block pointed to by the second pointer (S1005);

Sending an acknowledgement message from the accelerator to the host computer (S1010);

Fetching at least one data block by the accelerator from the storage module, according to the at least one second pointer and at least one block size parameter (S1015);

Writing the at least one fetched data block to a buffer, in a sequential order (S1020);

Sending at least one read request from the host computer to the accelerator, relating to the at least one data block referred to by the at least one second pointer (S1025);

If the data corresponding to the read request is available on the buffer, then sending a read response from the accelerator to the host, including the respective corresponding data from the staging buffer (S1030); and If the data corresponding to the read request is not available on the staging buffer, then delaying the read response by the accelerator until the data is fetched from the storage module (S1035).

As explained above, data access operations commonly require copying data from non-sequential source memory areas to a single, sequential destination memory area, to be used by a requesting process. Such operations may involve multiple, separate Direct Memory Access (DMA) transactions, to access different, non-sequential addresses of the source memory. The latency of non-sequential data access operations increases with the data storage entropy (e.g. the extent to which the data is non-sequential), as all copy operations must be completed before the data itself can be used by the requesting process.

Accessing non-sequential data on the source memory will normally include the steps of: (1) Copying each data unit separately, using a separate DMA transaction; (2) Polling for all DMA transactions to be completed; and (3) Enabling another process to access the source memory only after all the data of the previous process has been read. This work flow may be unacceptable in latency-sensitive applications.

In typical cases, the data itself may be used in a sequential manner (e.g. the data which is copied by the first DMA transaction may be used first by the requesting process). However, this quality is difficult to exploit in order to pipeline the DMA transactions with the requesting process itself. Typically, pipelining the requesting process with the DMA transactions requires dividing the requesting process into multiple sub-processes, each waiting for its own DMA transaction to be completed. This architecture requires a multiple polling scheme: both on the DMA transaction, and on the sub-process which makes use of the copied data, each waiting for the other to be completed.

Embodiments may improve the operation of a computerized system, for example by streamlining retrieval of data stored on a storage device by a host computer. In some embodiments, a staging buffer may receive a plurality of data block addresses and may handle the fetching of data from the storage device, without consuming resources (e.g. memory allocation and processing cycles) from the host computer. Non-sequential data may be fetched by the buffer and later propagated to the host in any required order, thus compensating for non-linearity or high entropy of the requested data and improving the latency of both data fetching and data processing by the host computer. Staging buffer 210 may provide the host computer with the requested data, or portions thereof as soon as they are fetched. This may enable the host computer to process the fetched data as soon as possible, and not wait for the entirety of the requested data to be fetched. Accelerator 200 may send a read response to the host computer, including the required data. This may remove the need of the host computer to poll for the required data, let alone perform multiple polling by separate processes. Other or different improvements may occur.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of pipelining read-access transactions between a host computer and a computer storage module, comprising:
    transferring from the host computer to an accelerator a first pointer to a read list, wherein the read list comprises: at least one second pointer to at least one data block stored on the storage module, and at least one block size parameter referring to the size of the at least one data block pointed to by the second pointer;
    sending an acknowledgement message from the accelerator to the host;
    fetching at least one data block by the accelerator from the storage module, according to the at least one second pointer and at least one block size parameter;
    writing the at least one fetched data block to a staging buffer;
    sending at least one read request from the host computer to the accelerator, relating to at least one data block referred to by the at least one second pointer; and
    sending a read response from the accelerator to the host, comprising the corresponding data from the staging buffer.

2. The method of claim 1, further comprising: if data corresponding to the read request is available on the staging buffer, then sending a read response from the accelerator to the host, comprising the corresponding data from the staging buffer; and if the data corresponding to the read request is not available on the staging buffer, then delaying the read response by the accelerator until the corresponding data is fetched from the storage module.

3. The method of claim 2, wherein writing the at least one fetched data block to a staging buffer is done in a sequential order.

4. The method of claim 3, wherein fetching at least one data block from the storage module by the accelerator is performed by direct memory access (DMA) transactions.

5. The method of claim 3, further comprising customizing the size of the staging buffer according to predefined parameters, including at least one of: expected data block size, expected data fetch rate, expected data read rate, host computer memory resources, host computer processing resources and host computer load.

6. The method of claim 3, further comprising sending at least one read response from the accelerator to the host computer prior to fetching all the data from the storage module referred to by the at least one second pointer of the read list.

7. The method of claim 3, wherein the staging buffer is cyclic, and wherein the accelerator is configured to increment a write pointer of the cyclic buffer whenever a data block is fetched from storage, according to the size of a fetched data block; and wherein the accelerator is configured to increment a read pointer of the cyclic buffer whenever a read response is sent to the host, according to the size of a read data block.

8. The method of claim 7, further comprising delaying a fetch of a data block from the storage module by the accelerator if the difference between the read pointer and the write pointer of the cyclic buffer is such that the data block may not be fetched without overriding data that has not yet been read from the cyclic buffer by the host computer.

9. A system for pipelining read-access transactions between a host computer and a computer storage module, comprising:
    a staging buffer; and
    an accelerator comprising a non-transitory memory device, whereupon modules of computer code are stored, and a processor associated with the non-transitory memory device, wherein the processor is configured to execute the modules of computer code, and wherein upon execution of the modules of computer code the accelerator is configured to:
    receive from the host computer a first pointer to a read list, wherein the read list comprises: at least one second pointer to data blocks stored on the storage module, and a respective at least one block size parameter;
    send an acknowledgement message to the host computer;
    fetch at least one data block from the storage module, according to the at least one second pointer and at least one block size parameter;
    write the at least one fetched data block to the staging buffer;
    receive at least one read request from the host computer, relating to the at least one data block referred to by the at least one second pointer; and
    send a read response to the host computer, comprising the corresponding data from the staging buffer.

10. The system of claim 9, wherein the accelerator is further configured to:

if the data corresponding to the read request is available on the staging buffer, then send a read response to the host computer, comprising the corresponding data from the staging buffer; and if the data corresponding to the read request is not available on the staging buffer, then delay the read response until the corresponding data is fetched from the storage module.

11. The system of claim 10, wherein the accelerator is further configured to write the at least one fetched data block to the staging buffer in a sequential order.

12. The system of claim 11, wherein the accelerator is further configured to fetch at least one data block from the storage module by direct memory access (DMA) transactions.

13. The system of claim 11, wherein the accelerator is further configured to customize the size of the staging buffer according to predefined parameters, including at least one of: expected data block size, expected data fetch rate, expected data read rate, host computer memory resources, host computer processing resources and host computer load.

14. The system of claim 11, wherein the accelerator is further configured to send at least one read response to the host computer prior to fetching all the data from the storage module referred to by the at least one second pointer of the read list.

15. The system of claim 11, wherein the staging buffer is cyclic, and wherein the accelerator is further configured to:
   increment a write pointer of the cyclic buffer whenever a data block is fetched from storage, according to the size of the fetched data block; and
   increment a read pointer of the cyclic buffer whenever a read response is sent to the host, according to the size of the read data block.

16. The system of claim 15, wherein the accelerator is further configured to delay a fetch of a data block from the storage module if the difference between the read pointer and the write pointer of the cyclic buffer is such that the additional data block may not be fetched without overriding data that has not yet been read from the cyclic buffer by the host computer.

* * * * *